United States Patent
Baldwin

[15] 3,685,658
[45] Aug. 22, 1972

[54] LIQUID FILTERS

[72] Inventor: Jesse A. Baldwin, Kearnesy, Nebr.

[73] Assignee: J. A. Baldwin Manufacturing Copany, Kearnesy, Nebr.

[22] Filed: Nov. 2, 1970

[21] Appl. No.: 86,027

[52] U.S. Cl. ............................................. 210/440
[51] Int. Cl. ........................................... B01d 45/00
[58] Field of Search....... 210/DIG. 17, 130, 440, 444, 210/457

[56] References Cited
UNITED STATES PATENTS 3,315,809   4/1967   Hultgren.................20/440 X

*Primary Examiner*—Reuben Friedman
*Assistant Examiner*—R. W. Burks
*Attorney*—J. Harold Kilcoyne

[57] ABSTRACT

A spin- or thread-on type oil filter whose filter housing which mounts within its interior space the filter element or cartridge comprises a cylindrical, thin sheet-metal shell or can body closed at one end by an integral dome-shaped end wall and at its other end by a separately fashioned closure plate assembly made up of a heavy-gauge metal base plate whose outer rim portion is planar and has diameter substantially equal to the inner diameter of the shell, and an annular sheet metal seaming cover which is lock-seamed along its outer peripheral or rim portion to the open-end wall portion of the shell and extends radially inwardly therefrom and in flush engagement with the under (outer) face of said base plate, the improvement comprising radially inwardly directed circumferential beads or formations rolled or otherwise provided in the cylindrical wall of the shell at locations immediately above (axially inwardly of) and below (axially outwardly of) the base plate, said circular beads serving as lock-shoulders which lock the base plate against movement in either axial direction relative to the shell and/or seaming cover.

3 Claims, 2 Drawing Figures

PATENTED AUG 22 1972
3,685,658
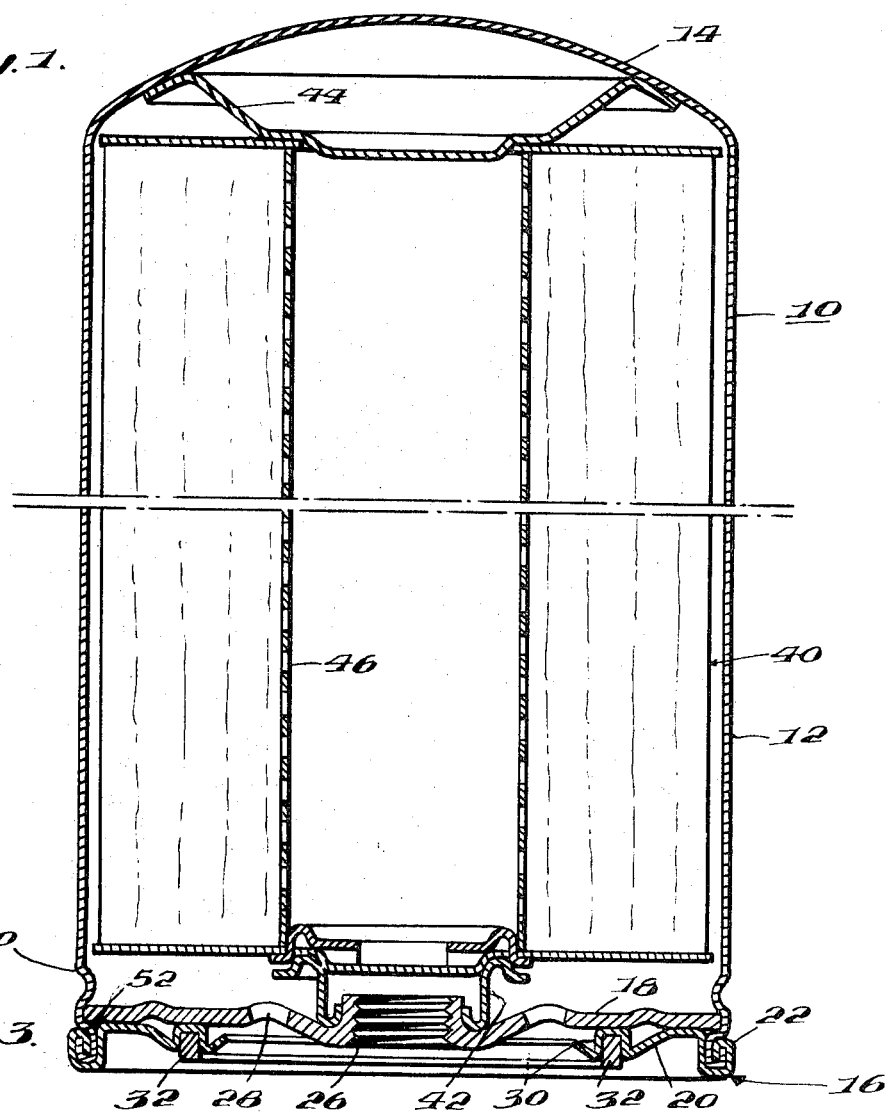
Fig. 1.
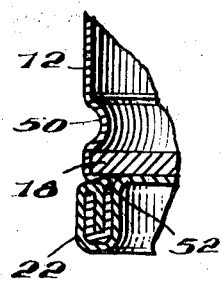
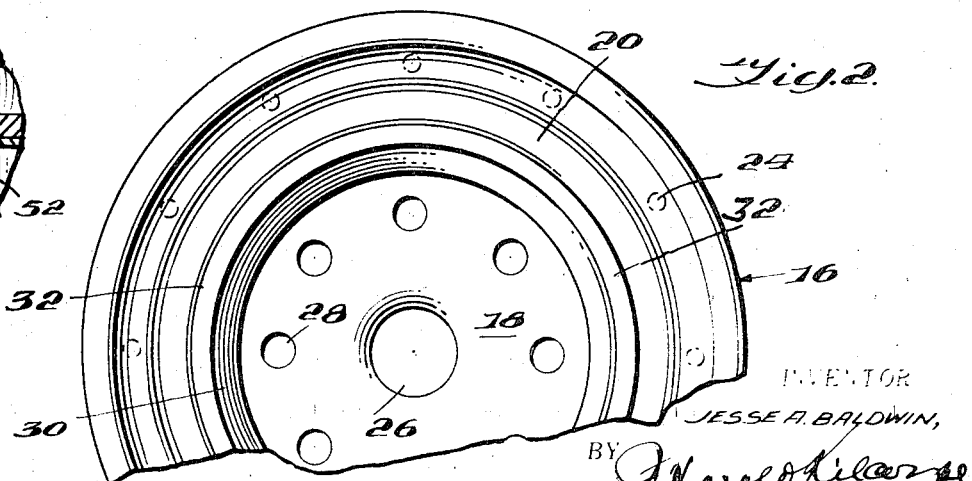
Fig. 3.
Fig. 2.
INVENTOR
JESSE A. BALDWIN,
BY J. Harold Kilcoyne
ATTORNEY

LIQUID FILTERS

GENERAL STATEMENT OF THE INVENTION

This invention relates to improvements in liquid filters, and more particularly in oil filters of the full-flow, spin- or thread-on type adapted to be mounted by screw-threading same on to an engine-block fitting and, when so mounted, functioning as a means to filter out therefrom harmful contaminants usually contained in the lubricating oil being supplied to the bearings and other parts of an internal combustion engine requiring lubrication, under the pressure of an engine-driven oil pump.

BACKGROUND OF THE INVENTION

The can or housing of a spin-on type oil filter as usually constructed comprised a thin-metal, generally cylindrical shell closed at its one (distal from its mounting) end by an integral dome-shaped end wall and at its other or mounting end by a separately fashioned closure-plate assembly including a heavy-gauge reinforcing plate (in the art and herein termed a base plate) and a thin-metal annular seaming cover which was secured flush against the outer (under) surface of said base plate by spots of weld and was in turn lock-seamed along its outer periphery to the cylindrical, open-end wall portion of said shell, the annular thin-metal seaming cover thus serving in one of its functions to secure the thick-metal base plate to the thin-metal filter shell of the housing.

Although it was recognized by oil filter designers and manufacturers that spin- or screw-on oil filters, because of their direct mounting on the engine block, would be subject to engine vibration, it was not foreseen that with some engines, particularly an engine powering a truck or like heavy-duty vehicle, and because of unfavorable filter mounting location and in some instances substantial distance of such locations from the axis of the crankshaft, engine vibration to which the filter is subject can be so severe as to impair if not destroy the oil tightness of the joint between the thin-metal filter shell and the base plate assembly which together make up the filter housing. More particularly, it appears not to have been earlier appreciated, although recent tests have established same to be the fact, that under the condition of severe (high amplitude) vibration transmitted to the filter from the engine, the filter shell or can under the weight of its contents tends to override the base plate during each vibration period and actually to vibrate with a slightly greater amplitude of vibration than that of the base plate. This action tended to rupture the aforementioned weld spots, to impair the oil tightness of the seam between the thin-metal shell and seaming cover, and also to unduly stress and cause cracking of the seaming cover itself.

OBJECTS OF THE INVENTION

Stated broadly, the present invention contemplates and provides an oil filter characterized by a mechanical joint between the initially open end of the cylindrical thin-metal shell and the closure-plate assembly together making up the closed filter housing or can, which joint is so designed and constructed as to be capable of locking the heavy-gauge metal base plate of the base plate assembly in place within and to the thin sheet-metal filter can or shell with a security that, should the filter be set in vibration, the filter shell, the seaming cover and the base plate will vibrate at the same amplitude.

The invention further contemplates and provides an oil filter whose housing is comprised by a thin sheet-metal, generally cylindrical shell closed at one end by a separately fashioned closure-plate assembly including a heavy-gauge disc-form metal base plate and an annular thin sheet-metal seaming cover, which latter is lock-seamed along its outer edge portion to the initially open edge portion of said shell and extends radially inwardly therefrom to lie flush against the relatively outer (under) face of said base plate, wherein the thin sheet-metal filter shell is formed with integral shoulder means which lock the base plate in fixed axial position therein relative to both shell and seaming cover, and with a security as makes unnecessary the spot- or tack-welding of seaming cover to base plate according to the prior practice.

The invention further contemplates and provides a mechanical leak-proof weldless joint between the initially open end of a thin-metal filter shell and the closure plate assembly which provides a closure for its open end, wherein said joint is constructed and arranged as to be capable of withstanding engine vibration of such high amplitude as previously was likely to cause rupture of the spots of weld conventionally employed to secure the heavy-gauge metal base plate to the sheet-metal seaming cover of the base plate assembly and thereby to the thin-metal shell itself.

DETAILED DESCRIPTION OF THE INVENTION

An oil filter incorporating an improved mechanical oil-tight weldless joint between the initially open end of the cylindrical thin-metal shell and the outer periphery of the separately fashioned closure-plate assembly which together form a filter housing (as herein contemplated and provided), will now be described in detail in connection with the accompanying drawing illustrating a preferred physical form thereof, wherein:

FIG. 1 is a vertical section taken through an oil filter which incorporates the improved oil-tight joint between shell and closure plate assembly according to the invention;

FIG. 2 is a bottom plan view of the filter shown in FIG. 1; and

FIG. 3 is a fragmentary detail view in section illustrating the means by which the thick-metal base plate of the reinforcing or closure plate assembly is held firmly and positively in place within the filter shell according to the invention.

In said drawing figures, reference numeral 10 generally designates an oil filter of the spin- or thread-on type, whose housing is formed by a cylindrical thin-metal shell 12 closed at one end, i.e., its end distal from that through which the oil enters and leaves the filter housing, by an integral dome-shaped end wall 14 and at its other end by a separately fashioned closure plate assembly 16. As is more or less conventional, said closure plate assembly comprises a thick-metal base plate 18 shown to have outer-edge diameter which is substantially equal to that of the inner diameter of the filter shell whereby to be readily insertible in the shell but at the same time to have close fit therein, and an annular thin-metal seaming cover 20, which latter derives its name from the fact that it is lock-seamed as at 22 along its outer periphery to the initially cylindrical, open-end wall portion of the aforesaid shell 12, as fashions a cylindrically extending locking connection or joint with said shell, from the circular line of which said thin-metal cover extends radially inwardly for a substantial distance so as to lie flush against the outer (under) surface of the heavy-gauge metal base plate 18 to which (according to prior practice) it was secured by circumferentially spaced spots of weld shown in dot-dash lines, FIG. 2.

As is usual, the thick-metal base plate 18 is provided in its central portion with an axially inwardly directed tubular neck 26 which is internally threaded, as enables the filter to be screwed as a unit on to an engine-block fitting such as an externally threaded nipple or pipe (not shown) whose bore receives the filtered oil leaving the filter and returns it to the oil lubricating line, and is further provided with a plurality of smaller oil-inlet openings 28 disposed on a circle having radius intermediate that of the inner circular edge of the annular seaming cover 20 and that of the circle of the neck 26. The usual downwardly facing groove 30 for the reception of a ring-shaped sealing gasket 32 is formed in the seaming cover, which gasket is adapted to sealingly engage a seating surface provided on the engine block when the filter is screwed down to its full-mounted position thereon. Upon such sealing engagement having been effected, the gasket functions to seal off an annular space which extends about the engine block-provided nipple or pipe onto which the filter screws and which is defined relatively top and bottom by the under surface of the base plate and the facing surface of the engine block.

As is also usual, a filter element or cartridge 40 is approved construction and filtering capacity is enclosed within the filter housing. More particularly, said filter element is supported in centered, i.e., coaxial, relation within the cylindrical shell 12 and in raised position from the base plate 18 by a tubular ferrule 42 against which it is spring-urged by a plate spring 44 reactive between the inside surface of the dome-shaped end wall 14 of said shell and the upper-end cap of said filter element. As is well known, such an arrangement provides that when the engine to whose block the filter is mounted is placed in operation, oil under pressure developed by the engine-driven oil pump is caused to flow into the interior of the filter housing, thence radially inwardly through the filtering media of the filter element to its center tube 46 and thence axially outwardly from the filter through the bore of the neck 26, and from thence back to the oil line.

The above described filter construction is well known in the art, and no claim of patentable novelty is made thereto except as it represents basic or background construction for the improvement feature(s) forming the subject-matter of the present invention and which as forecast above is directed to means for positively locking the heavy-gauge base plate 18 of the closure plate assembly to and in fixed position within the cylindrical thin sheet-metal filter shell 12, with a security such that should the filter be set in vibration, and particularly high amplitude vibration, the filter shell and base plate will vibrate with substantially the same amplitude of vibration.

As conducive to a proper understanding of the invention and the solution which it offers (to be shortly described), it is stated that when a filter according to the afore-described basic construction is mounted on an engine having a lot of vibration, said filter because of its screw-on attachment to the block of the engine is set in vibration. Should such vibration be severe, i.e., of high amplitude, which is entirely possible in the case of filters being mounted on truck- and similar heavy-duty engines, it can happen that the filter shell will during each period of vibration override the more rigid base plate of the base plate assembly and actually vibrate with a greater amplitude than that of said base plate. When such action occurs, the spots or tacks of weld which in prior filter constructions provided substantially the sole securement of the heavy-gauge base plate 18 to the thin-metal filter shell 12 via the thin-metal seaming cover 20 where excessively strained, as was the seaming cover itself, such causing rupture of the weld spots and cracking of the seaming cover, all to the detriment of the oil tightness of the joint between the filter shell 12 and the cover plate assembly 16.

The present invention offers the following simple solutation to the aforesaid problem, namely, that of providing as by a rolling operation two inwardly directed circumferential beads 50, 52 in the wall of the cylindrical filter shell at axially spaced-apart locations thereof disposed immediately above (axially inwardly of) and below (axially outwardly of) the base plate location, which beads project into the shell interior space to a depth such that they function as lock shoulders which positively lock the heavy-gauge base plate 18 directly to and in fixed axial position within the thin-metal shell 12. With the base plate securely locked in place as aforesaid, not only is the necessity of providing indirect securement of the heavy-gauge base plate 18 to thin-metal filter shell 12 via the seaming cover 20 by the spots of weld 24 completely avoided (although such indirect securement may be provided in supplement to the locking action of the circumferential beads 50, 52 if desired), but also strain on and possible cracking of the thin-metal seaming cover are relieved to a substantial degree, even under the adverse conditions of high amplitude vibration being transmitted to the filter from the engine.

It is to be observed that while the inner (upper) circumferential bead 50 is clearly discernible as such in FIGS. 1 and 3 of the drawing, the outer (lower) circumferential bead 52 is not as clearly discernible as such, for the reason that the lock seam 22 has moved into and in effect has filled the outward concavity thereof.

It is to be understood, however, that according to the invention, said lower circumferential bead 52 is very definitely rolled into the shell wall prior to the lock seam 22 being compressed radially inwardly to its final position shown in FIGS. 1 and 3; that said lock seam at this stage of filter fabrication, although substantially fully formed, is spaced radially outwardly from the inwardly depressed wall of the shell forming the lower bead 52 by what may be termed an annular void; and that in a final operation the lock seam is forced or rolled radially inwardly into and in filling relation to said annular space or void, as effects snugging of the metal of the shell in under the outer peripheral or rim edge of the base plate 18. By such forcing of the formed lock seam in radial inward direction so that it fills the void or space provided by the already rolled-in bead 52, not only is wrinkling and/or cracking of the thin metal of the can and/or seaming cover avoided, but also the lock seam 22 has an effective outer diameter which corresponds substantially to that of the outer diameter of the filter shell 12.

From the foregoing and a consideration of the drawing figures which illustrate the manner in which the circumferential beads 50, 52 function as circumferential stop shoulders which lock the base plate firmly in a fixed position to and within the cylindrical filter shell, it will be appreciated that the herein invention provides a simple yet highly effective means for directly locking the heavy-gauge base plate forming a component of a base plate assembly of a screw-on type filter directly to and in fixed axial position to and within the thin-metal filter shell, with the security such that should the filter as a whole be subject to severe vibration consequent to its being mounted directly to the block of an engine which has a lot of vibration in operation, all significant parts of the filter will vibrate with the same amplitude of vibration, thus to relieve any one part thereof from excessive strain and/or cracking as may and often does result in oil tightness of the joint between filter shell and its base plate assembly being impaired if not destroyed. Also it is to be understood that the invention is susceptible to change and modification as would occur to one versed in the particular art and which falls within the scope of the appended claims.

I claim:

1. An oil filter of the spin- or screw-on type comprising a cylindrical thin-metal filter shell closed at one end by an integral end wall and at its other end by a separately fashioned closure-plate assembly including a generally disc-form heavy-gauge metal base plate whose rim portion is planar and has outer diameter substantially equal to the inner diameter of said cylindrical shell and an annular thin-metal seaming cover having along its outer circular edge a cylindrically extending lock-seam connection with the open-edge portion of the shell, said thin-metal seaming cover extending radially-inwardly from said connection and lying substantially flush against the outwardly disposed (under) face of said base plate, and means for locking said heavy-gauge metal base plate to and in fixed position within the thin-metal cylindrical shell with a security such as insures that under a condition of severe vibration said filter shell and base plate assembly including the heavy-gauge base plate of the latter will vibrate with substantially the same amplitude of vibration, said means comprising two circumferential internal beads provided in the filter shell wall at locations thereof disposed closely above and closely below said base plate, said beads forming shoulders serving to hold the base plate firmly in fixed axial position within the filter shell.

2. An oil filter according to claim 1, wherein said cylindrically extending lock-seam is encompassed within the outer-circle line of the filter shell proper.

3. An oil filter according to claim 1, wherein said cylindrically extending lock seam substantially fills the radially outwardly facing concavity defined by said lower circumferential bead.

* * * * *

UNITED STATES PATENT OFFICE
CERTIFICATE OF CORRECTION

Patent No. 3,685,658     Dated  August 22, 1972

Inventor(s)  Jesse A. Baldwin

It is certified that error appears in the above-identified patent and that said Letters Patent are hereby corrected as shown below:

On the cover sheet [72] and [73] "Kearnesy" should read -- Kearney -- .

Signed and sealed this 1st day of May 1973.

(SEAL)
Attest:

EDWARD M. FLETCHER, JR.          ROBERT GOTTSCHALK
Attesting Officer                Commissioner of Patents